United States Patent
Bashir et al.

(10) Patent No.: US 10,468,058 B1
(45) Date of Patent: Nov. 5, 2019

(54) MAGNETIC WRITE HEAD WITH A TAPERED RETURN POLE

(71) Applicant: Western Digital Technologies, Inc., San Jose, CA (US)

(72) Inventors: Muhammad Asif Bashir, San Jose, CA (US); Petrus Antonius Van Der Heijden, Cupertino, CA (US); Takuya Matsumoto, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/022,273

(22) Filed: Jun. 28, 2018

(51) Int. Cl.
| | |
|---|---|
| *G11B 5/31* | (2006.01) |
| *G11B 5/60* | (2006.01) |
| *G11B 7/1387* | (2012.01) |
| *G11B 5/00* | (2006.01) |

(52) U.S. Cl.
CPC ............ *G11B 5/6082* (2013.01); *G11B 5/314* (2013.01); *G11B 5/3116* (2013.01); *G11B 5/3163* (2013.01); *G11B 5/6088* (2013.01); *G11B 7/1387* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,212,379 B2 * | 5/2007 | Hsu | .................. | G11B 5/1278 360/125.16 |
| 7,554,765 B2 | 6/2009 | Shukh et al. | | |
| 7,643,246 B2 * | 1/2010 | Yazawa | ................ | G11B 5/1278 360/119.04 |
| 7,692,896 B2 | 4/2010 | Kameda et al. | | |
| 7,835,111 B2 | 11/2010 | Flint et al. | | |
| 7,920,358 B2 | 4/2011 | Jiang et al. | | |
| 8,164,855 B1 * | 4/2012 | Gibbons | ................ | G11B 5/3116 360/125.74 |
| 8,194,512 B2 * | 6/2012 | Stipe | .................... | G11B 5/6088 369/112.27 |
| 8,279,719 B1 * | 10/2012 | Hu | ......................... | G11B 5/105 369/13.01 |
| 8,289,650 B2 | 10/2012 | Seigler et al. | | |

(Continued)

FOREIGN PATENT DOCUMENTS

CN        101145347 B        5/2012

OTHER PUBLICATIONS

Michael Cordle, "Effects of Skew Angle and Transition Curvature in HAMR Hard Disk Drives," University of Minnesota Master's Thesis dated May 2017 (available at https://conservancy.umn.edu/handle/11299/188808).

*Primary Examiner* — William J Klimowicz
(74) *Attorney, Agent, or Firm* — Jacobsen IP Law

(57) ABSTRACT

Disclosed herein are HAMR-enabled write heads for data storage devices, data storage devices comprising such HAMR-enabled write heads, and methods of fabricating such HAMR-enabled write heads. A HAMR-enabled write head comprises a leading side, a trailing side, an air-bearing surface (ABS), a main pole disposed between the leading side and the trailing side and extending to the ABS, a return pole comprising a tapered portion at the ABS, wherein the tapered portion is disposed between the main pole and the leading side and extends toward the main pole, and a waveguide disposed between the main pole and the return pole.

24 Claims, 13 Drawing Sheets

(56) References Cited

U.S. PATENT DOCUMENTS

| | | | |
|---|---|---|---|
| 8,307,540 B1 * | 11/2012 | Tran | G11B 5/314 219/209 |
| 8,310,901 B1 * | 11/2012 | Batra | G11B 5/1278 369/112.27 |
| 8,331,205 B2 * | 12/2012 | Seigler | G11B 5/1278 369/112.27 |
| 8,416,530 B2 | 4/2013 | Gao et al. | |
| 8,432,638 B2 * | 4/2013 | Sechi | G11B 5/112 360/125.23 |
| 8,451,555 B2 * | 5/2013 | Seigler | G11B 5/02 360/125.01 |
| 8,477,452 B2 | 7/2013 | Sasaki et al. | |
| 8,630,153 B1 * | 1/2014 | Wang | G11B 5/1278 369/13.13 |
| 8,649,124 B2 | 2/2014 | Zou et al. | |
| 8,649,245 B2 | 2/2014 | Goulakov et al. | |
| 8,659,980 B2 | 2/2014 | Seigler et al. | |
| 8,873,352 B1 * | 10/2014 | Jandric | G11B 5/3133 369/112.27 |
| 8,929,028 B2 | 1/2015 | Hsiao et al. | |
| 9,042,209 B2 | 5/2015 | Balamane et al. | |
| 9,153,254 B1 | 10/2015 | Rivkin et al. | |
| 9,311,935 B2 * | 4/2016 | Clinton | G11B 5/314 |
| 9,355,661 B2 | 5/2016 | Seigler et al. | |
| 9,443,541 B1 | 9/2016 | Liu et al. | |
| 9,672,846 B1 | 6/2017 | Tanaka et al. | |
| 9,805,753 B2 | 10/2017 | Ho et al. | |
| 2003/0128633 A1 | 7/2003 | Batra et al. | |
| 2004/0190197 A1 * | 9/2004 | Watabe | G11B 5/3116 360/125.42 |
| 2004/0201918 A1 * | 10/2004 | Guan | G11B 5/1278 360/119.02 |
| 2005/0128637 A1 | 6/2005 | Johnston et al. | |
| 2005/0219764 A1 * | 10/2005 | Kameda | G11B 5/1278 360/313 |
| 2006/0082931 A1 * | 4/2006 | Fukui | G11B 5/1278 360/317 |
| 2006/0209459 A1 * | 9/2006 | Im | G11B 5/1278 360/125.03 |
| 2007/0064343 A1 * | 3/2007 | Yazawa | G11B 5/1278 360/125.12 |
| 2007/0285837 A1 * | 12/2007 | Im | G11B 5/1278 360/125.03 |
| 2008/0088972 A1 | 4/2008 | Sasaki et al. | |
| 2008/0239568 A1 * | 10/2008 | Miyatake | G11B 5/3116 360/119.03 |
| 2009/0073858 A1 * | 3/2009 | Seigler | G11B 5/314 369/112.27 |
| 2009/0190256 A1 * | 7/2009 | Schabes | G11B 5/1278 360/121 |
| 2009/0296275 A1 | 12/2009 | Sasaki et al. | |
| 2010/0128579 A1 * | 5/2010 | Seigler | G11B 5/1278 369/13.32 |
| 2010/0157472 A1 | 6/2010 | Hsiao et al. | |
| 2010/0188783 A1 * | 7/2010 | Taguchi | G11B 5/11 360/319 |
| 2010/0208391 A1 * | 8/2010 | Gokemeijer | G11B 5/314 360/314 |
| 2013/0028059 A1 | 1/2013 | Huang et al. | |
| 2015/0122772 A1 * | 5/2015 | Clinton | G11B 5/314 216/22 |
| 2017/0323659 A1 | 11/2017 | Matsumoto | |

\* cited by examiner

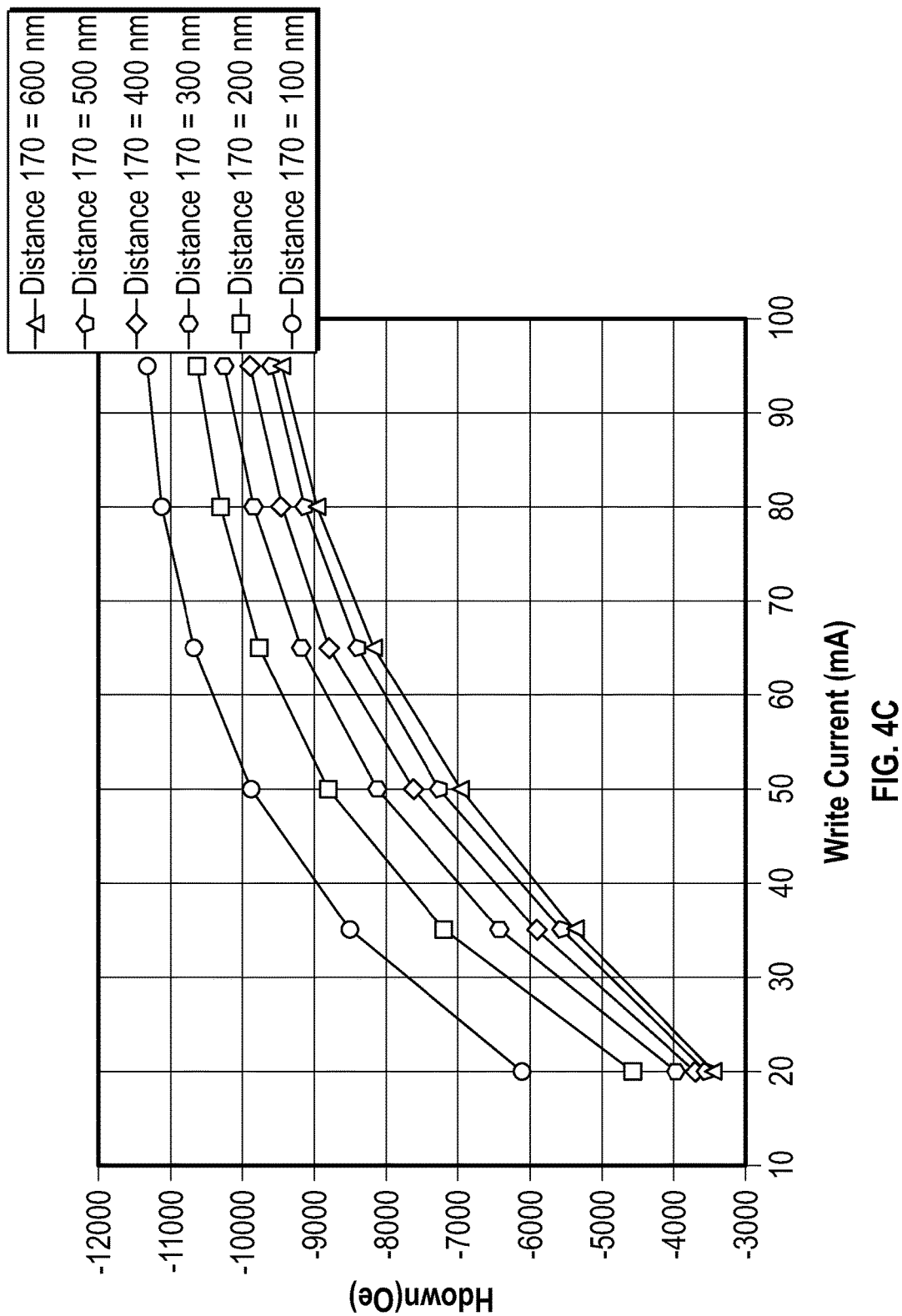

MAGNETIC WRITE HEAD WITH A TAPERED RETURN POLE

BACKGROUND

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher-magnetic-moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

There is an ongoing need to improve the performance of HAMR-enabled write heads.

SUMMARY

This summary represents non-limiting embodiments of the disclosure.

Disclosed herein are write heads for data storage devices, data storage devices (e.g., hard disk drives) comprising such write heads, and methods of fabricating such write heads. A magnetic write head has a leading side, a trailing side, an air-bearing surface (ABS), a main pole disposed between the leading side and the trailing side and extending to the ABS, a return pole comprising a tapered portion at the ABS, wherein the tapered portion is disposed between the main pole and the leading side and extends toward the main pole, and a waveguide disposed between the main pole and the return pole. In some embodiments, the tapered portion comprises three sides. In some embodiments, a cross-section of the tapered portion has a triangular shape. In some embodiments, a maximum height of the tapered portion is approximately 400 nm.

In some embodiments, the tapered portion comprises a waveguide-facing side and an ABS-facing side, and an angle between the waveguide-facing side and the ABS-facing side is an acute angle. In some such embodiments, the size of the acute angle is between approximately 30 and approximately 45 degrees.

In some embodiments, the magnetic write head also includes a mirror layer disposed between the tapered portion and the waveguide.

In some embodiments, the distance at the ABS between the main pole and the tapered portion is between approximately 100 nm and approximately 600 nm. In some embodiments, the distance at the ABS between the main pole and the tapered portion is approximately 300 nm.

In some embodiments, the tapered portion comprises an ABS-facing side, a first waveguide-facing side, and a second waveguide-facing side. In some such embodiments, the length of the first waveguide-facing side is approximately 50 nm. In some such embodiments, the length of the second waveguide-facing side is between approximately 495 nm and approximately 700 nm.

In some embodiments in which the tapered portion comprises an ABS-facing side, a first waveguide-facing side, and a second waveguide-facing side, the length of the first waveguide-facing side is greater than 0 and less than approximately 10 nm. In some embodiments in which the tapered portion comprises an ABS-facing side, a first waveguide-facing side, and a second waveguide-facing side, an angle between the ABS-facing side and the second waveguide-facing side is between approximately 30 degrees and approximately 45 degrees. In some embodiments in which the tapered portion comprises an ABS-facing side, a first waveguide-facing side, and a second waveguide-facing side, an angle between the ABS-facing side and the second waveguide-facing side is approximately 30 degrees, or approximately 45 degrees.

A method of fabricating a write head for a data storage device comprises forming a return pole comprising a tapered portion at an air-bearing surface (ABS), where the tapered portion extends in a first direction, forming a main pole, and forming an optical component between the return pole and the main pole such that, after the method of fabricating the write head is complete, the first direction is toward the main pole.

In some embodiments, forming the return pole is performed before forming the optical component and before forming the main pole. In other embodiments, forming the return pole is performed after forming the main pole and after forming the optical component. In some embodiments, forming the return pole comprises forming a main portion of the return pole, and forming the tapered portion on the main portion.

In some embodiments, forming the optical component comprises forming waveguide cladding and a waveguide core.

In some embodiments, the method further comprises forming a near-field transducer coupled to the optical component. In some embodiments, the method further comprises forming a mirror layer between the return pole and the optical component.

BRIEF DESCRIPTION OF THE DRAWINGS

Objects, features, and advantages of the disclosure will be readily apparent from the following description of certain embodiments taken in conjunction with the accompanying drawings in which:

FIG. 4C is a plot of the down-track magnetic field as a function of the write current for various embodiments.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim or claims.

Figure 1:
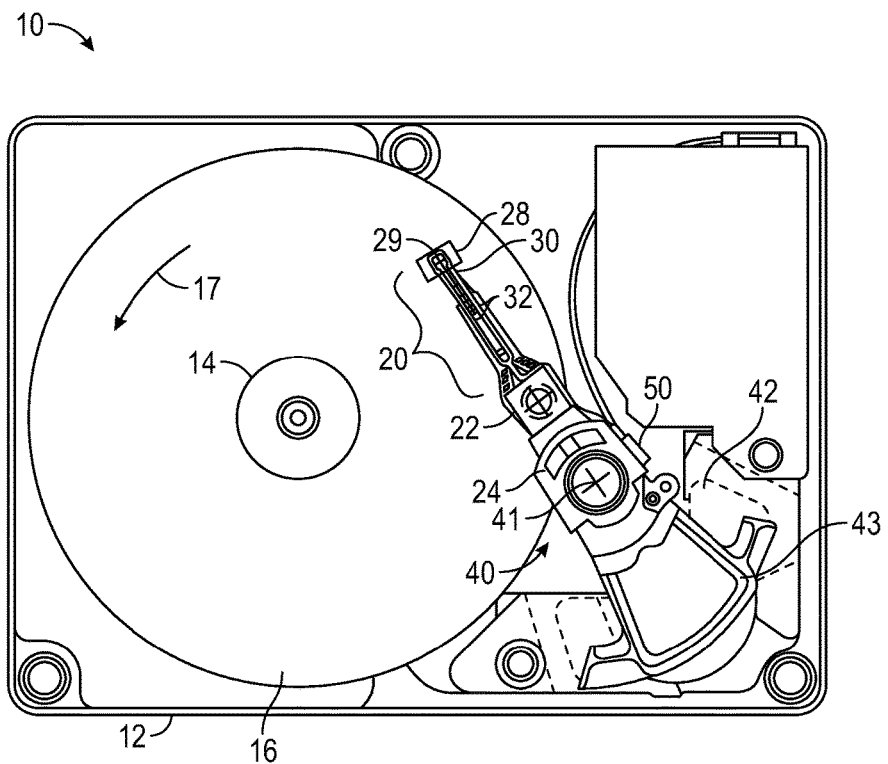
FIG. 1 illustrates a hard disk drive into which the embodiments disclosed herein may be incorporated.

FIG. 1 is a top view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing edge of the slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC).

As the disk 16 rotates, the disk 16 drags air or another gas (e.g., helium) under the slider 28 and along the air-bearing surface (ABS) of the slider 28 in a direction approximately parallel to the tangential velocity of the disk 16. As the air passes under the ABS, air compression along the air flow path causes the air pressure between the disk 16 and the ABS to increase, which creates a hydrodynamic lifting force that counteracts the tendency of the at least one load beam assembly 20 to push the slider 28 toward the disk 16. The slider 28 thus flies above the disk 16 but in close proximity to the surface of the disk 16.

The slider 28 supports the read/write head 29. As the disk 16 rotates in the direction of the arrow 17, the movement of the actuator assembly 40 allows the read/write head 29 on the slider 28 to access different data tracks on the disk 16. The slider 28 is typically formed of a composite material, such as a composite of alumina/titanium-carbide ($Al_2O_3$/TiC). FIG. 1 illustrates only one disk 16 surface with associated slider 28 and read/write head 29, but there may be multiple disks 16 stacked on a hub that is rotated by a spindle motor, with a separate slider 28 and read/write head 29 associated with each surface of each disk 16.

For writing, the read/write head 29 may be a perpendicular recording head that includes a main pole and a return pole. The main pole and return pole are separated from each other by a write gap at the ABS and are connected to each other at a region distal from the ABS by a back gap closer or back via. One or more layers of conductive coils, encapsulated by insulating layers, are positioned between the main pole and the return pole. To write data to the disk 16, an electric current flows through the conductive coils to induce a magnetic field across the write gap between the main pole and the return pole. By reversing the direction of the current through the coil(s), the polarity of the data written to the magnetic media may be reversed.

In some embodiments, the read/write head 29 includes a HAMR-enabled write head. (As stated previously, the term "HAMR" as used herein refers to all variants of thermally-assisted recording, including TAR, TAMR, EAMR, and HAMR.) In HAMR, a magnetic recording material with high magneto-crystalline anisotropy ($K_u$) is heated locally while the HAMR-enabled write head writes to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR-enabled write head uses a laser source and an optical waveguide coupled to a near-field transducer (NFT) for heating the recording material on the disk. Light from the laser source heats a portion of the magnetic recording medium (e.g., the disk 16) prior to a write operation being performed. The NFT is typically located at the ABS of the slider that rides or "flies" above the disk surface. A NFT may have a generally triangular output end, such that an evanescent wave generated at a surface of the waveguide couples to surface plasmons excited on the surface of the NFT, and a strong optical near-field is generated at the apex of the triangular output end.

The light from the laser can be focused via a waveguide core layer and the NFT on a precise location of the magnetic medium to reduce the coercivity of that location of the magnetic medium prior to the main write pole performing a write operation. This allows improved areal density to be achieved by allowing the laser to be focused precisely so that the light can be directed at the desired location on the magnetic recording medium. A semiconductor laser with a wavelength of, for example, 780 to 980 nm may be used as the HAMR light source. The laser may be supported on the top of the slider 28, or it may be located on the flexure 30 and coupled to the slider 28 by an optical channel.

In operation, after the voice coil 43 has positioned the read/write head 29 over the data tracks on the disk 16, the read/write head 29 (e.g., a HAMR-enabled write head) may be used to write information to one or more tracks on the surface of the disk 16 and to read previously-recorded information from the tracks on the surface of the disk 16. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

Figure 2:
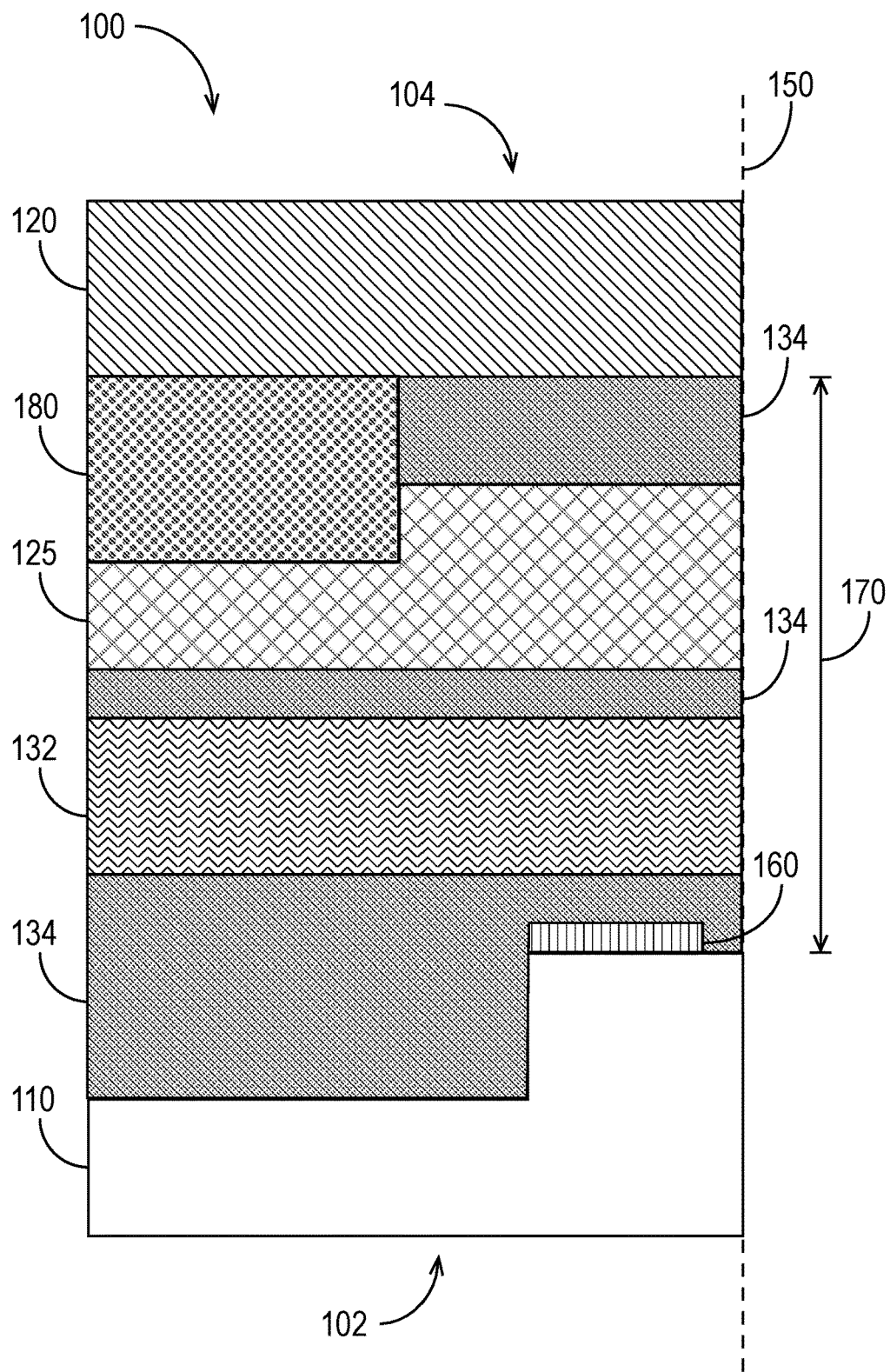
FIG. 2 is a cross-sectional schematic of a HAMR-enabled write head.

FIG. 2 is a cross-sectional schematic of a portion of an exemplary HAMR-enabled write head 100. The HAMR-enabled write head 100 is included in a slider 28, and may include layers and/or components that are not illustrated in FIG. 2. The HAMR-enabled write head 100 has a leading side 102, a trailing side 104, and an ABS 150. The leading side 102 is closer than the trailing side 104 to the leading edge of the slider 28, and the trailing side 104 is closer than the leading side 102 to the trailing edge of the slider 28. The leading side 102 passes over the region of the media to be written before the trailing side 104 passes over. In other words, referring to FIG. 1 and the arrow 17 showing the direction in which the disk 16 rotates, the leading side 102 is closer than the trailing side 104 to the pivot point 41.

The HAMR-enabled write head 100 includes a main pole 120, which is configured to emit a recording magnetic field for affecting the magnetic media. The main pole 120 serves as a first electrode and has a front portion at the ABS 150. The HAMR-enabled write head 100 also includes a return pole 110, which serves as a second electrode and also has a front portion at the ABS 150. The main pole 120 and return pole 110 are both constructed of a magnetic material that produces a high saturation flux density, such as, for example, NiFe, CoFeNi, or CoFe. As shown in FIG. 2, the return pole 110 is closer to the leading side 102 than is the main pole 120. Similarly, the main pole 120 is closer to the trailing side 104 than is the return pole 110.

The HAMR-enabled write head 100 also includes a NFT 125 and a waveguide comprising waveguide cladding 134 and a waveguide core layer 132. The NFT 125 is positioned between the main pole 120 and the waveguide core layer 132. The NFT 125 may comprise a conductive low-loss metal (e.g., Au, Ag, Al, Cu, or alloys of Au, Ag, Al, and/or Cu). In the exemplary embodiment illustrated in FIG. 2, the NFT 125 has a surface parallel to and spaced from the waveguide core layer 132 by a waveguide cladding layer 134 having some thickness (typically 5 to 50 nm) between the waveguide core layer 132 and the NFT 125. The NFT 125 has an output tip at the ABS 150. In an ABS view of the HAMR-enabled write head 100, the output tip of the NFT 125 may have a roughly triangular or trapezoidal shape. As shown in FIG. 2, the waveguide cladding 134 surrounds the NFT 125, insulating at least the NFT 125 output tip from the waveguide core layer 132, any heat sink that may surround the main pole 120, and the main pole 120 itself.

The waveguide core layer 132 is disposed near the NFT 125 in the HAMR-enabled write head 100. As explained above, the waveguide core layer 132 is separated from the NFT 125 by the waveguide cladding 134. The waveguide core layer 132 and the waveguide cladding 134 may comprise dielectric materials selected so that the refractive index of the waveguide core layer 132 is greater than the refractive index of the waveguide cladding 134, thereby facilitating the efficient propagation of light through the waveguide core layer 132. For example, $Al_2O_3$ may be used as the waveguide cladding 134 material and $TiO_2$ as the waveguide core layer 132 material. Alternatively, $SiO_2$ may be used as the waveguide cladding 134 material and $Ta_2O_5$, $TiO_2$, $SiO_xN_y$, or Ge-doped $SiO_2$ as the waveguide core layer 132 material. The waveguide core layer 132 may be single-mode or multi-mode, although single-mode may be preferable because multi-mode waveguides may cause power fluctuations due to intermode interference.

FIG. 2 (and other drawings herein) illustrates the NFT 125 and the waveguide in one possible configuration relative to each other. It is to be understood that the NFT 125 and waveguide core 132 may also be in a "direct-fire" configuration in which the NFT 125 is aligned with the waveguide core 132 in the direction of transmission of the light. In a direct-fire configuration, light localized in the waveguide core 132 is directly fired at the NFT 125, which transfers energy to the media in a desired region.

A thermal shunt 180 may be positioned recessed from the NFT 125 output tip between the NFT 125 and the main pole 120 to conduct heat away from the NFT 125 and to the main pole 120. The thermal shunt 180 may comprise heat-conductive material such as, for example, Cu, Au, Ag, or alloys of Au, Ag, Al, and/or Cu. The thermal shunt 180 may help to reduce the temperature rise of the NFT 125 as the HAMR-enabled write head 100 operates, thereby reducing the likelihood of thermal damage to the NFT 125 and potentially forestalling performance degradations and/or failures.

The HAMR-enabled write head 100 may also include a heat sink (not shown). If present, the heat sink may surround the main pole 120 on its trailing side to conduct heat away from the main pole 120 and facilitate heat transfer to the magnetic media. The heat sink may comprise heat-conductive material such as, for example, Cu, Au, Ag, or alloys of Au, Ag, Al, and/or Cu.

Optionally, a mirror layer 160 may be sandwiched between the return pole 110 and the waveguide core layer 132. If present, the mirror layer 160 helps direct the electromagnetic energy into the waveguide core layer 132 to improve the energy transfer to the NFT 125. The mirror layer 160 can also reflect scattered light from the NFT 125 and return the light to the NFT 125 (to suppress the scattered light) when the distance between the NFT 125 and the mirror layer 160 is selected appropriately, which can improve the optical efficiency of the NFT 125. If present, the mirror layer 160 comprises a reflective material such as Au, Rh, and/or a Au alloy. If used, the mirror layer 160 may be positioned at an acute or obtuse angle relative to the plane of the ABS 150 to further optimize the energy transfer to the NFT 125.

In operation, electromagnetic energy (e.g., light) from the laser source is introduced into the waveguide core layer 132. The light propagates along the length of the waveguide core layer 132, and an evanescent wave is generated at the surface of the waveguide core layer 132 proximate the ABS 150. The evanescent wave at the surface of the waveguide core layer 132 polarizes in a direction along the plane of the ABS 150, coupling to a surface plasmon excited on the surface of the NFT 125 output tip. The surface plasmon causes charges to move in a down-track direction and concentrate in the space at the ABS 150 between the NFT 125 output tip and the end of the main pole 120, subsequently generating a localized electrical field that is known as an optical near-field spot. The electric field heats a portion of the hard recording layer of the magnetic media, thereby lowering its coercivity in the specific portion or "bit" so that the magnetic field from the main pole 120 can alter its magnetization. The main pole 120 then applies a magnetic field and affects the magnetization of the portion of the magnetic media at the optical near-field spot.

As shown in FIG. 2, at the ABS 150, the main pole 120 and the return pole 110 are separated by a distance 170. The nearest magnetic flux closure path for the main pole 120 is provided by the return pole 110, which may be, relatively speaking, a considerable distance from the main pole 120. Larger distances 170 can result in slower saturation (and, therefore, slower switching speed) relative to smaller distances 170. Therefore, to improve switching speed and performance of the HAMR-enabled write head 100, it is desirable to reduce the distance 170 between the main pole 120 and the return pole 110.

One way to reduce the distance 170 between the main pole 120 and the return pole 110 is to reduce the thickness of the waveguide cladding 134 between the NFT and the waveguide core layer 132 to zero. But doing so may cause the optical efficiency of the NFT 125 to decrease, which can have a negative impact on the performance of the HAMR-enabled write head 100. Furthermore, reducing the distance 170 between the main pole 120 and the return pole 110 can undesirably increase the down-track component of the write field while decreasing the perpendicular component. Therefore, there is a need for solutions that improve switching speed (i.e., the time needed to switch the magnetic polarization of the poles of the magnetic write head) without incurring substantial optical losses and magnetic field degradations (e.g., decreases in the perpendicular component and/or increases in the down-track component).

Disclosed herein are tapered return poles 110 that improve flux closure and writer saturation while mitigating optical losses. Some embodiments provide for achieving a target magnetic field strength with a lower write current than is achievable using HAMR-enabled write heads 100 that do not use tapered return poles 110. In some embodiments, the use of a tapered return pole 110 allows the distance between the main pole 120 and the return pole 110 to be halved and the write current to be reduced by several mA without degrading the magnitude of the write field.

Figure 3A:
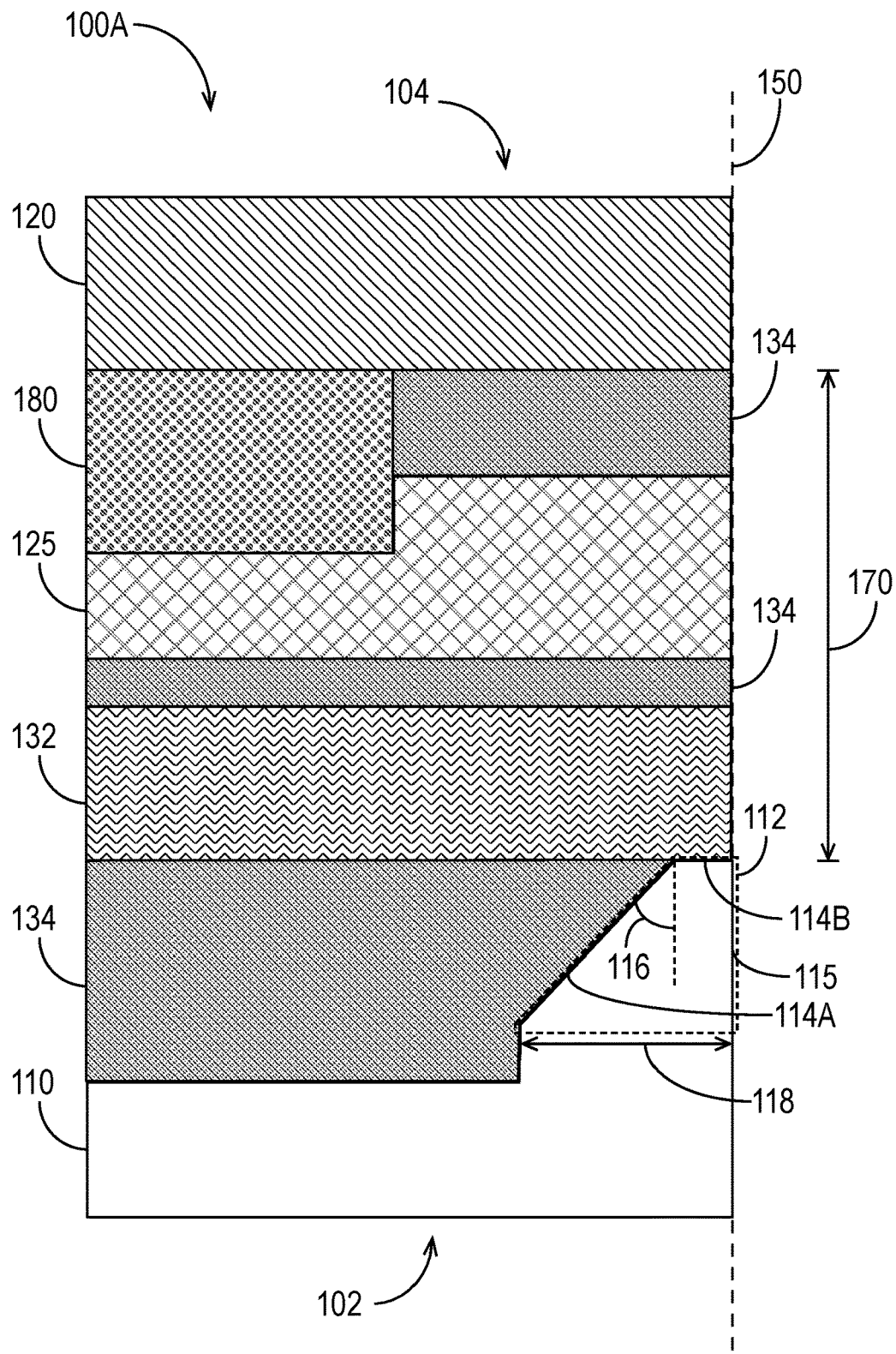
FIG. 3A illustrates an exemplary HAMR-enabled write head in accordance with some embodiments.

FIG. 3A illustrates an exemplary HAMR-enabled write head 100A in accordance with some embodiments. The exemplary HAMR-enabled write head 100A includes many of the same components as the HAMR-enabled write head 100 of FIG. 2, and the explanations of these like components are not repeated in the discussion of FIG. 3A, which focuses on the tapered return pole 110.

As shown in FIG. 3A, the exemplary HAMR-enabled write head 100A includes a return pole 110 that has a tapered portion 112 at the ABS 150. FIG. 3A illustrates a tapered portion 112 having three sides that form a portion of a quadrilateral (e.g., a non-isosceles trapezoid), but it is to be understood that the tapered portion 112 may have any suitable shape. For example, FIGS. 3C and P5, discussed below, show tapered portions 112 that have triangular shapes. The tapered portion 112 may also have an irregular shape, uniform or non-uniform sides, more or fewer than three sides, etc.

The tapered portion 112 adjoins the rest of the return pole 110 and is disposed between the main pole 120 and the leading side 102 of the HAMR-enabled write head 100A. The tapered portion 112 extends in a direction toward the main pole 120, thereby decreasing the distance 170 in FIG. 3A relative to the distance 170 shown in FIG. 2. In some embodiments, the distance 170 at the ABS 150 between the main pole 120 and the tapered portion 112 of the return pole 110 is between approximately 100 nm and approximately 600 nm. In some embodiments, the distance 170 at the ABS 150 between the main pole 120 and the tapered portion 112 of the return pole 110 is approximately 300 nm.

The tapered portion 112 has a maximum height 118, which is measured from the plane of the ABS 150. In the exemplary embodiment shown in FIG. 3A, the maximum height 118 is where the tapered portion 112 meets the rest of the return pole 110. In other embodiments, the maximum height 118 is at a different location within the tapered portion 112. In some embodiments, the maximum height 118 of the tapered portion 112 is approximately 400 nm.

The exemplary tapered portion 112 shown in FIG. 3A has two waveguide-facing sides 114A, 114B, and an ABS-facing side 115. In FIG. 3A, the waveguide-facing side 114B is at a right angle to the ABS-facing side 115. In other embodiments, the waveguide-facing side 114B is not at a right angle to the ABS-facing side 115. For example, in some embodiments, the intersection of the waveguide-facing side 114B and the ABS-facing side 115 forms an acute angle. In some embodiments, the intersection of the waveguide-facing side 114B and the ABS-facing side 115 forms an obtuse angle.

In the exemplary tapered portion 112 of FIG. 3A, the waveguide-facing side 114A is offset from and does not touch the ABS-facing side 115. In addition, the waveguide-facing side 114A is at an angle 116 to the ABS-facing side 115. The angle 116 is referred to herein as being "between" the waveguide-facing side 114A and the ABS-facing side 115, even though the waveguide-facing side 114A and the ABS-facing side 115 do not intersect in the exemplary embodiment shown in FIG. 3A (i.e., they are separated by the waveguide-facing side 114B). The angle 116 may be an acute angle or an obtuse angle. In the example of FIG. 3A, the angle 116 between the waveguide-facing side 114A and the ABS-facing side 115 is an acute angle. In some embodiments, the size of the acute angle 116 is between approximately 30 degrees and approximately 45 degrees. Stated another way, in some embodiments, such as the one illustrated in FIG. 3A, the (unlabeled) angle between the waveguide-facing side 114A and the waveguide-facing side 114B of the tapered portion 112 is between approximately 120 degrees and approximately 135 degrees because the waveguide-facing side 114B is at a 90 degree angle to the ABS-facing side 115 in FIG. 3A.

In some embodiments, the angle 116 is approximately 30 degrees, the waveguide-facing side 114B has a length of approximately 50 nm, and the waveguide-facing side 114A has a length of approximately 700 nm. In some embodiments, the angle 116 is approximately 45 degrees, the waveguide-facing side 114B has a length of approximately 50 nm, and the waveguide-facing side 114A has a length of approximately 495 nm.

It is to be understood that a HAMR-enabled write head 100A may include elements in addition to those shown in FIG. 3A. For example, the HAMR-enabled write head 100A may optionally include a shield or mirror layer 160 situated between the waveguide and the return pole 110, as discussed below in the context of other exemplary embodiments. Other elements were discussed above in the context of FIG. 2.

Figure 3B:
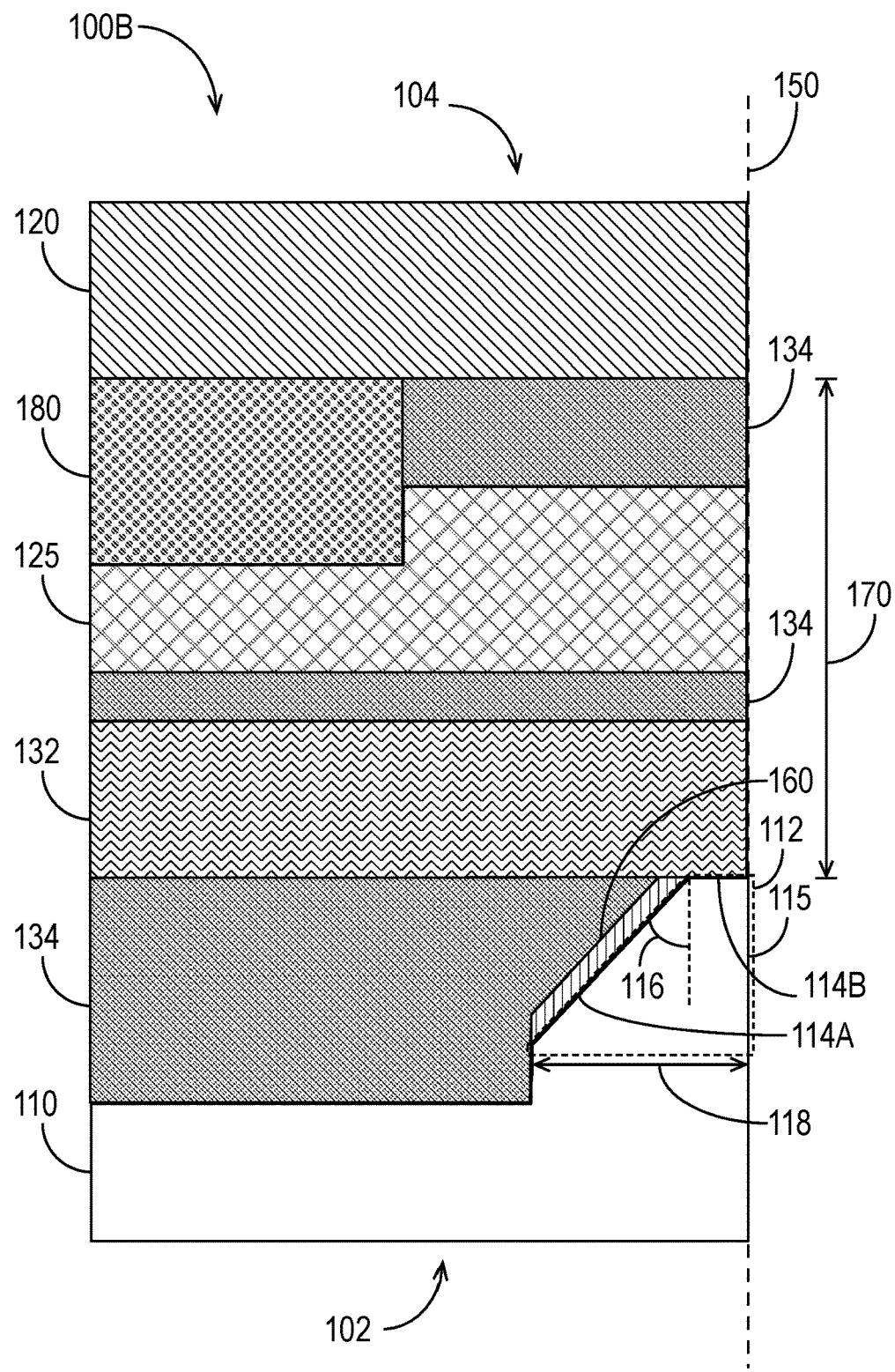
FIG. 3B illustrates another exemplary HAMR-enabled write head in accordance with some embodiments.

FIG. 3B illustrates another exemplary HAMR-enabled write head 100B in accordance with some embodiments. The exemplary HAMR-enabled write head 100B includes all of the components as the HAMR-enabled write heads 100 and 100A of FIGS. 2 and 3A, respectively, and the explanations of these components and their relationships are not repeated here.

Like FIG. 3A, FIG. 3B illustrates a tapered return pole 110 that includes a tapered portion 112. In addition, FIG. 3B illustrates a mirror layer 160 disposed between the tapered portion 112 and the waveguide (where the waveguide includes the waveguide cladding 134 and the waveguide core layer 132). The mirror layer 160 was described previously in the context of FIG. 2. The mirror layer 160 is an optional component of the HAMR-enabled write head 100B.

It is to be understood that a HAMR-enabled write head 100B may include elements in addition to those shown in FIG. 3B. For example, the HAMR-enabled write head 100B may optionally include a shield. Other elements were discussed above in the context of FIG. 2.

Figure 3C:
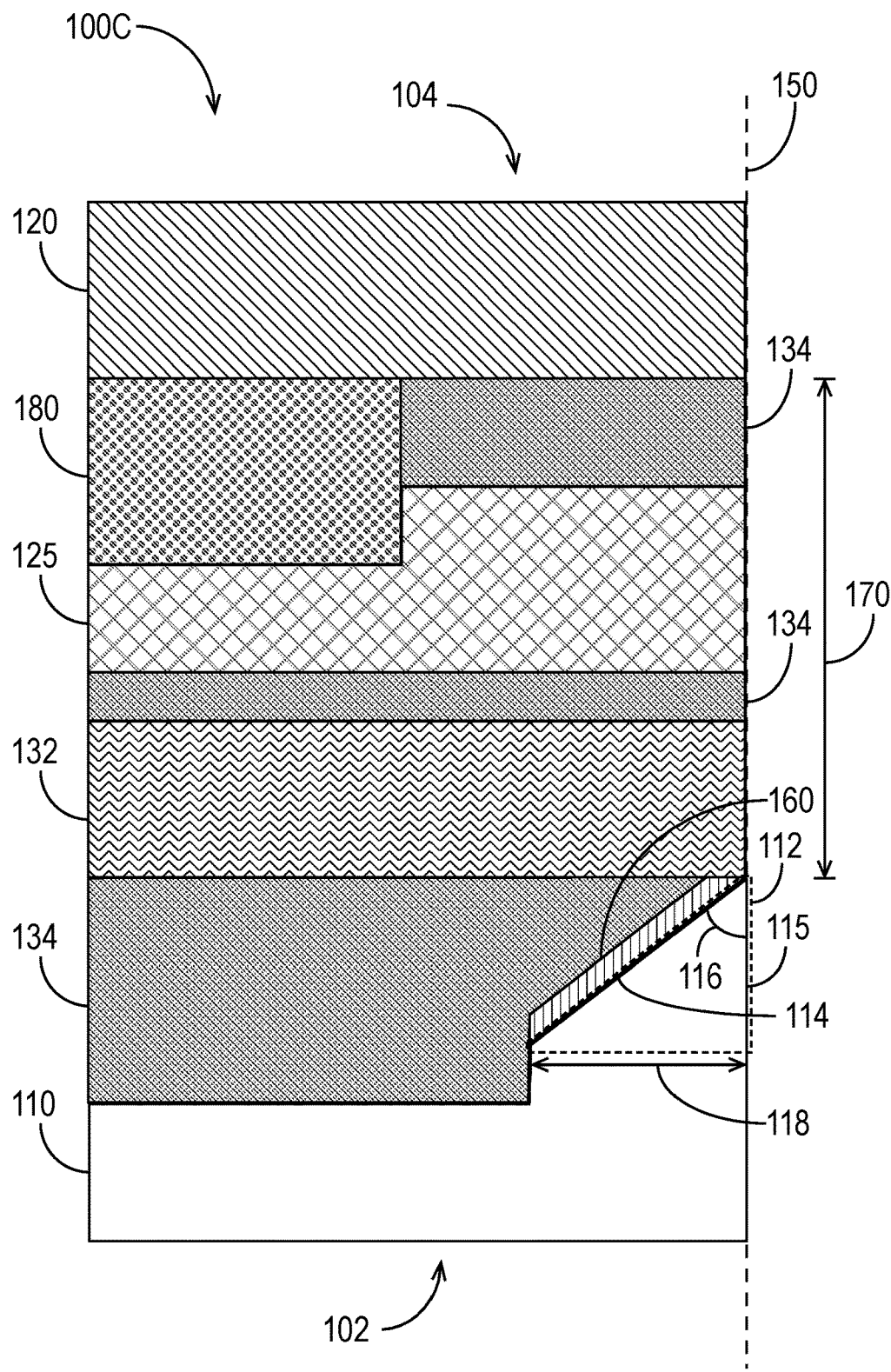
FIG. 3C illustrates another exemplary HAMR-enabled write head in accordance with some embodiments.

FIG. 3C illustrates another exemplary HAMR-enabled write head 100C in accordance with some embodiments. The exemplary HAMR-enabled write head 100C includes many of the same components as the HAMR-enabled write heads 100, 100A, and 100B of FIGS. 2, 3A, and 3B, respectively, and the explanations of these components and their relationships are not repeated here.

As shown in FIG. 3C, the HAMR-enabled write head 100C includes a return pole 110 that has a tapered portion 112 at the ABS 150. In the exemplary embodiment of FIG. 3C, the tapered portion 112 has a triangular shape. The tapered portion 112 is disposed between the main pole 120 and the leading side 102 of the HAMR-enabled write head 100C and extends toward the main pole 120, thereby decreasing the distance 170 in FIG. 3C relative to the distance 170 shown in FIG. 2. In some embodiments, the distance 170 at the ABS 150 between the main pole 120 and the tapered portion 112 of the return pole 110 is between approximately 100 nm and approximately 600 nm. In some embodiments, the distance 170 at the ABS 150 between the main pole 120 and the tapered portion 112 of the return pole 110 is approximately 300 nm.

The exemplary tapered portion 112 shown in FIG. 3C has one waveguide-facing side 114 and an ABS-facing side 115. The waveguide-facing side 114 is at an angle 116 to the ABS-facing side 115. The angle may be an acute angle or an obtuse angle. In the example of FIG. 3C, the angle 116 between the waveguide-facing side 114 and the ABS-facing side 115 is an acute angle. In some embodiments, the size of the acute angle 116 is between approximately 30 degrees and approximately 45 degrees.

In some embodiments, the angle 116 is approximately 30 degrees, and the waveguide-facing side 114 has a length of approximately 800 nm. In some embodiments, the angle 116 is approximately 45 degrees, and the waveguide-facing side 114 has a length of approximately 565 nm.

In the exemplary embodiment illustrated in FIG. 3C, the tapered portion 112 has a maximum height 118 where the tapered portion 112 meets the rest of the return pole 110. In some embodiments, the maximum height 118 of the tapered portion 112 is approximately 400 nm.

FIG. 3C also illustrates a mirror layer 160 disposed between the tapered portion 112 and the waveguide (comprising the waveguide cladding 134 and the waveguide core layer 132). The mirror layer 160 was described previously in the context of FIG. 2. The mirror layer 160 is an optional component of the HAMR-enabled write head 100C.

It is to be understood that a HAMR-enabled write head 100C may include elements in addition to those shown in FIG. 3C. For example, the HAMR-enabled write head 100C may optionally include a shield. Other elements were discussed above in the context of FIG. 2.

Figure 3D:
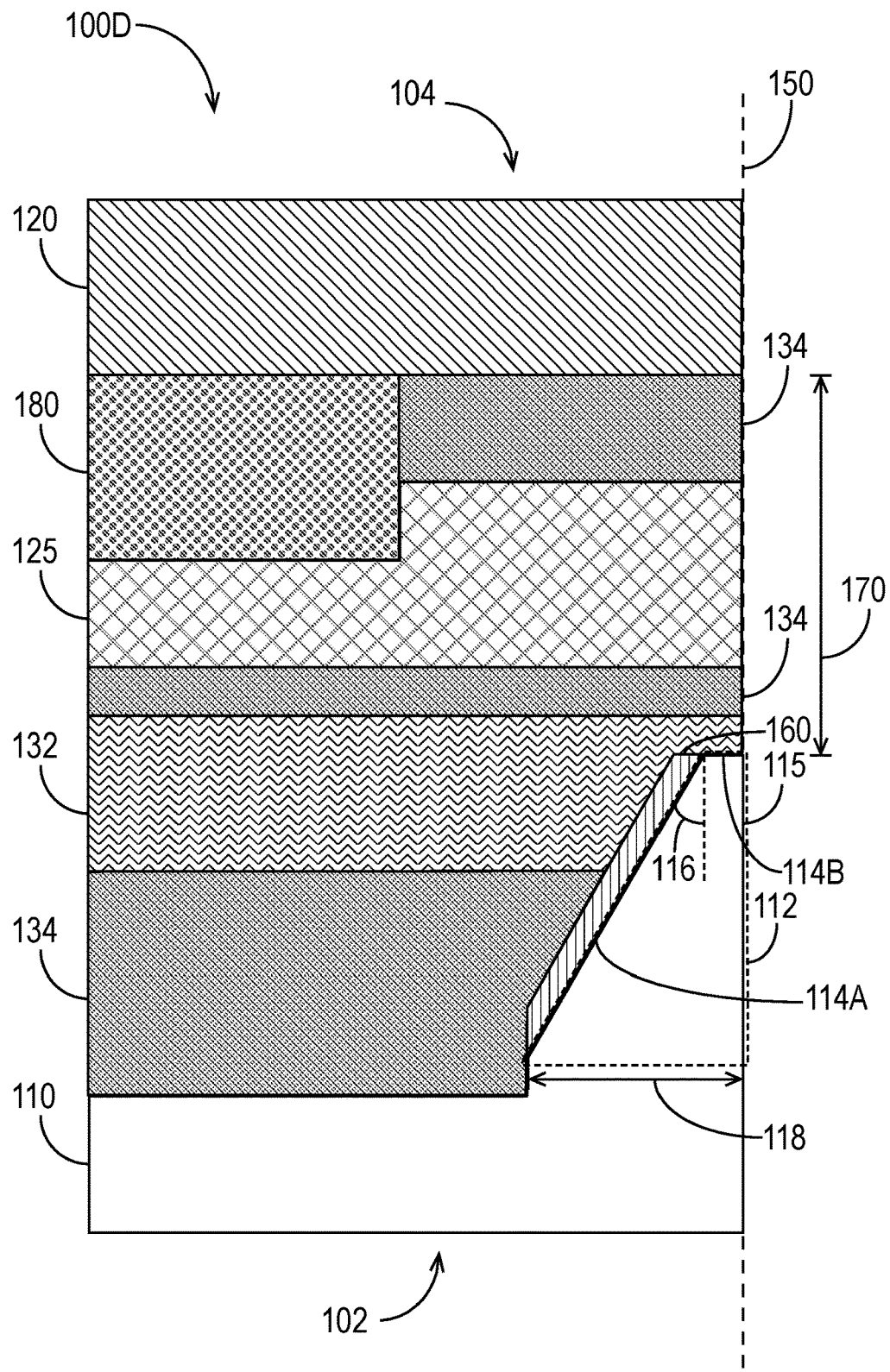
FIG. 3D illustrates another exemplary HAMR-enabled write head in accordance with some embodiments.

FIGS. 3A-3C illustrate return poles 110 with tapered portions 112 that replace a portion of waveguide cladding 134 but do not encroach into or replace any portion of the waveguide core layer 132. FIG. 3D illustrates an exemplary HAMR-enabled write head 100D in which the tapered portion 112 extends into the waveguide core layer 132. As in other exemplary embodiments, the tapered portion 112 is disposed between the main pole 120 and the leading side 102 of the HAMR-enabled write head 100D and extends toward the main pole 120, thereby decreasing the distance 170 in FIG. 3D relative to the distance 170 shown in FIGS. 2, 3A, 3B, and 3C. In some embodiments, the distance 170 at the ABS 150 between the main pole 120 and the tapered portion 112 of the return pole 110 is between approximately 100 nm and approximately 600 nm. In some embodiments, the distance 170 at the ABS 150 between the main pole 120 and the tapered portion 112 of the return pole 110 is approximately 300 nm.

The tapered portion 112 has a maximum height 118. In the exemplary embodiment shown in FIG. 3A, the maximum height 118 is where the tapered portion 112 meets the rest of the return pole 110. In some embodiments, the maximum height 118 of the tapered portion 112 is approximately 400 nm.

The exemplary tapered portion 112 shown in FIG. 3D has two waveguide-facing sides 114A, 114B, and an ABS-facing side 115. In the exemplary tapered portion 112, the waveguide-facing side 114B is at a right angle to the ABS-facing side 115. In other embodiments, the waveguide-facing side 114B is not at a right angle to the ABS-facing side 115. For example, in some embodiments, the intersection of the waveguide-facing side 114B and the ABS-facing side 115 forms an acute angle. In some embodiments, the intersection of the waveguide-facing side 114B and the ABS-facing side 115 forms an obtuse angle.

In the exemplary HAMR-enabled write head 100D shown in FIG. 3D, the waveguide-facing side 114A is offset from the ABS-facing side 115 and is at an angle 116 to the ABS-facing side 115. The angle 116 may be an acute angle or an obtuse angle. In the exemplary HAMR-enabled write head 100D, the angle 116 is an acute angle. In some embodiments, the size of the acute angle 116 is between approximately 30 degrees and approximately 45 degrees. Stated another way, in some embodiments, the (unlabeled)

angle between the waveguide-facing side 114A and the waveguide-facing side 114B of the tapered portion 112 is between approximately 120 degrees and approximately 135 degrees.

In some embodiments, the angle 116 is approximately 30 degrees, the waveguide-facing side 114B has a length of approximately 50 nm, and the waveguide-facing side 114A has a length of approximately 700 nm. In some embodiments, the angle 116 is approximately 45 degrees, the waveguide-facing side 114B has a length of approximately 50 nm, and the waveguide-facing side 114A has a length of approximately 495 nm.

FIG. 3D also illustrates a mirror layer 160 disposed between the tapered portion 112 and the waveguide (comprising the waveguide cladding 134 and the waveguide core layer 132). The mirror layer 160 was described previously in the context of FIG. 2. The mirror layer 160 is an optional component of the HAMR-enabled write head 100D, though its use may be particularly advantageous to reduce optical losses due to the encroachment of the tapered portion 112 into space that would otherwise have been occupied by the waveguide core layer 132.

As shown in FIG. 3D, the HAMR-enabled write head 100D provides for a substantial reduction in the distance 170 between the main pole 120 and the return pole 110 relative to, for example, the HAMR-enabled write head 100 shown in FIG. 2.

It is to be understood that a HAMR-enabled write head 100D may include elements in addition to those shown in FIG. 3D. For example, the HAMR-enabled write head 100D may optionally include a shield. Other elements were discussed above in the context of FIG. 2.

It is also to be understood that although FIGS. 3A-3D illustrate exemplary tapered portions 112 with trapezoidal or triangular shapes, these exemplary embodiments are not intended to be limiting. In general, the tapered portion 112 may have any size and/or shape that improves flux closure and writer saturation (e.g., it may have any number of sides (e.g., one or more); it may be uniform or non-uniform in shape; it may have one or more linear sides, one or more nonlinear sides, or a combination of linear and nonlinear sides; it may be formed from or represented by a concatenation, intersection, or union of shapes, etc.).

Furthermore, the tapered portion 112 may include different materials from those used in the rest of the return pole 110, or it may include additional materials relative to the rest of the return pole 110. For example, the tapered portion 112 may include at least one material having a different magnetic property (e.g., magnetic moment) than a material included in the rest of the return pole 110. As one example, the tapered portion 112 may have a gradient in saturation magnetization.

The characteristics (e.g., shape, dimensions, material, magnetic moment, etc.) of the tapered portion 112 and the distance 170 can be selected and/or optimized to achieve a desired or target performance. For example, the characteristics of the tapered portion 112 and the distance 170 can be selected to balance the write field and the optical performance for a given write current. To illustrate the impact of various aspects of the tapered portion 112 and the optional mirror layer 160 on performance, FIGS. 4A-4D and FIGS. 5A and 5B are plots illustrating the performances of various exemplary embodiments of HAMR-enabled write heads.

Figure 4A:
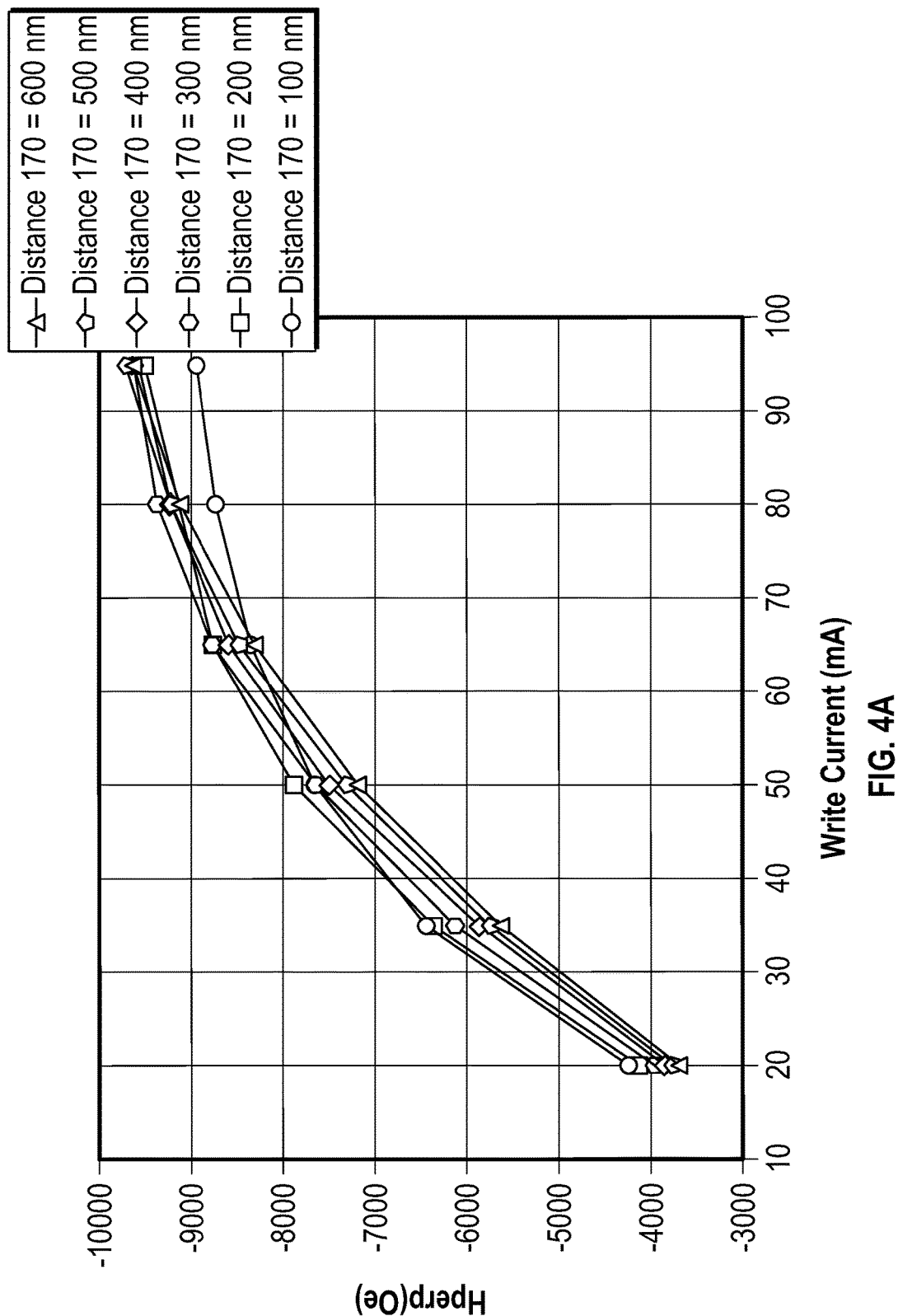
FIG. 4A is a plot of the perpendicular magnetic field as a function of the write current for various embodiments.

FIGS. 4A-4D show the impact of the distance 170 on the magnetic field for the exemplary HAMR-enabled write head 100A illustrated in FIG. 3A with a maximum height 118 of 400 nm, a waveguide-facing side 114B with a length of 50 nm, and an angle 116 of 30 degrees. FIG. 4A illustrates the perpendicular magnetic write field (in Oersted) as a function of the write current (in mA) for various values of the distance 170. For comparison purposes, the HAMR-enabled write head 100 of FIG. 2 (i.e., using a return pole 110 without a tapered portion 112) with a distance 170 of 600 nm provides a performance that is roughly equivalent to the performance of the return pole 110 with a tapered portion 112 at a distance 170 of 500 nm (i.e., the curve with pentagonal markers). As indicated by FIG. 4A, the use of the tapered portion 112 at distances 170 that are less than 500 nm provides improved performance in the perpendicular write field relative to the embodiment of FIG. 2 (the non-tapered return pole 110) with a distance 170 of 600 nm. For most write current values, the use of a return pole 110 with a tapered portion 112 allows the use of a lower write current to achieve the same magnetic field as the embodiment of FIG. 2. At larger write current values, optical losses begin to degrade the performance of the embodiment of FIG. 3A (with the selected parameters) when the distance 170 is 100 nm. Therefore, it may be preferable in some circumstances to maintain a distance 170 of more than 100 nm.

As would be expected, and confirmed by FIG. 4A, when the distance 170 between the tapered return pole 110 and the main pole 120 in the embodiment of FIG. 3A is 600 nm, the distance between the non-tapered portion of the return pole 110 and the main pole 120 is actually larger than in the embodiment of FIG. 2 (with the distance 170 being 600 nm), and this added distance results in a poorer magnetic field (shown by the curve with triangular markers) than with the non-tapered embodiment of FIG. 2 (nearly identical to the curve with pentagonal markers).

Figure 4B:
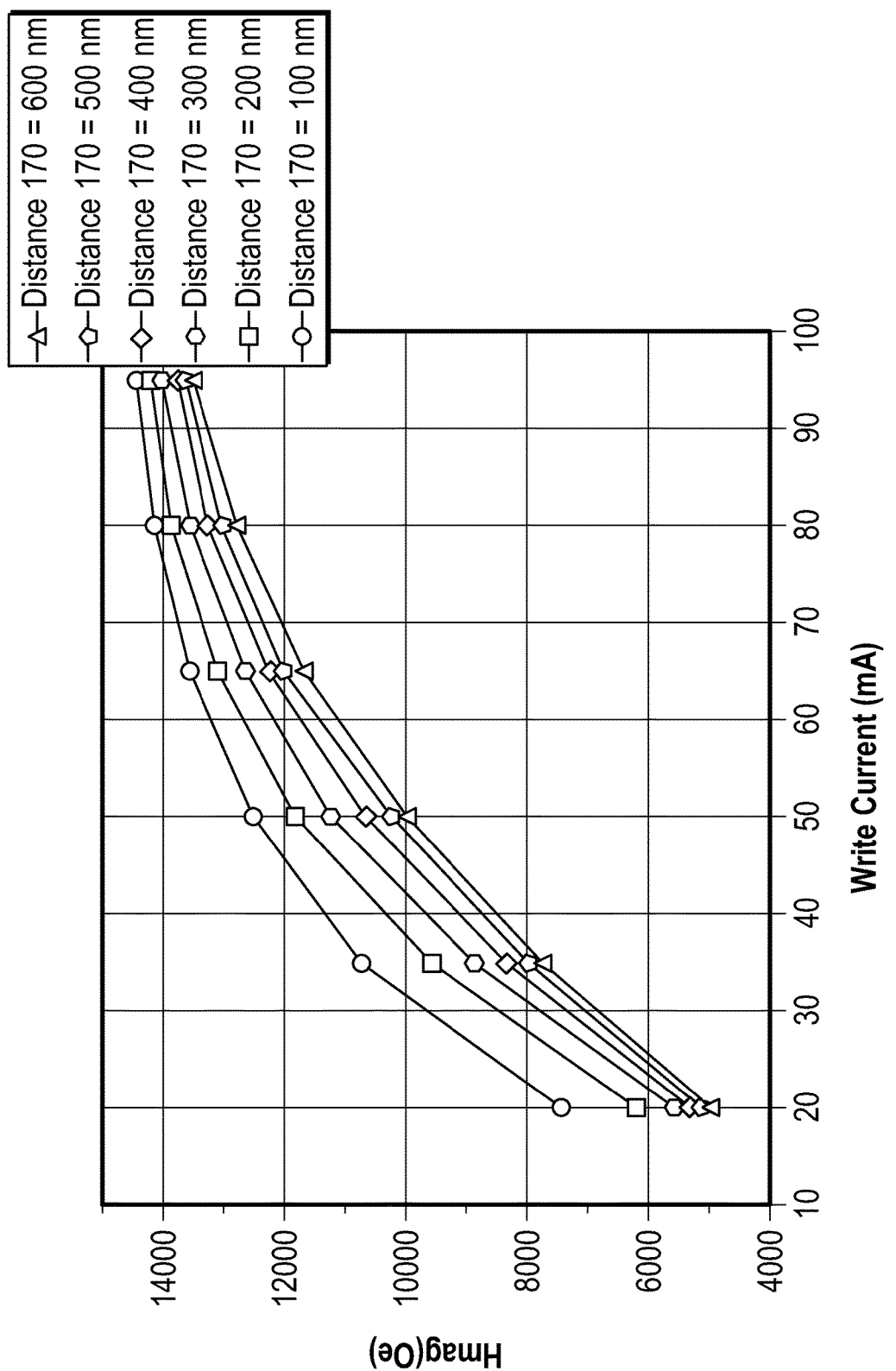
FIG. 4B is a plot of the magnitude of the magnetic field as a function of the write current for various embodiments.

FIG. 4B plots the magnitude of the magnetic write field as a function of the write current for various values of the distance 170. For comparison purposes, the non-tapered HAMR-enabled write head 100 of FIG. 2 with a distance 170 of 600 nm provides a performance that is roughly equivalent to the performance of the return pole 110 with a tapered portion 112 at a distance 170 of 500 nm (i.e., the curve with pentagonal markers). As indicated by FIG. 4B, the use of the tapered portion 112 at distances 170 that are less than 500 nm provides improved performance in the magnitude of the write field relative to the non-tapered embodiment of FIG. 2 with a distance 170 of 600 nm. For distances 170 less than 500 nm, the use of a return pole 110 with the described tapered portion 112 allows the use of a lower write current to achieve the same magnitude of the magnetic field. For example, if the target write field magnitude is 10,000 Oersted, the write current must be nearly 50 mA when the non-tapered HAMR-enabled write head 100 of FIG. 2 is used. By using the HAMR-enabled write head 100A with a distance 170 of 300 nm, however, the write current only needs to be about 43 mA. The use of a lower write current reduces power consumption and may also extend the life of the storage device in which the HAMR-enabled write head 100A is incorporated.

FIG. 4C is a plot showing the down-track magnetic field as a function of the write current for various values of the distance 170. As in FIGS. 4A and 4B, the HAMR-enabled write head 100 of FIG. 2 (i.e., having a return pole 110 without a tapered portion 112) with a distance 170 of 600 nm provides a performance that is roughly equivalent to the performance of the return pole 110 with a tapered portion 112 and a distance 170 of 500 nm (i.e., the curve with pentagonal markers). As indicated by FIG. 4C, the use of the tapered portion 112 at distances 170 that are less than 500 nm increases the down-track magnetic field relative to the non-tapered embodiment of FIG. 2 with a distance 170 of 600 nm. This increase, which is undesirable, is due to the magnetic flux leaking more easily into the tapered portion 112. As a comparison of FIGS. 4C and 4A indicates, however, the increase in the down-track magnetic field is accompanied by an increase in the perpendicular magnetic field, which may result in the overall effect being neutral (i.e., neither helpful nor harmful to performance).

Figure 4D:
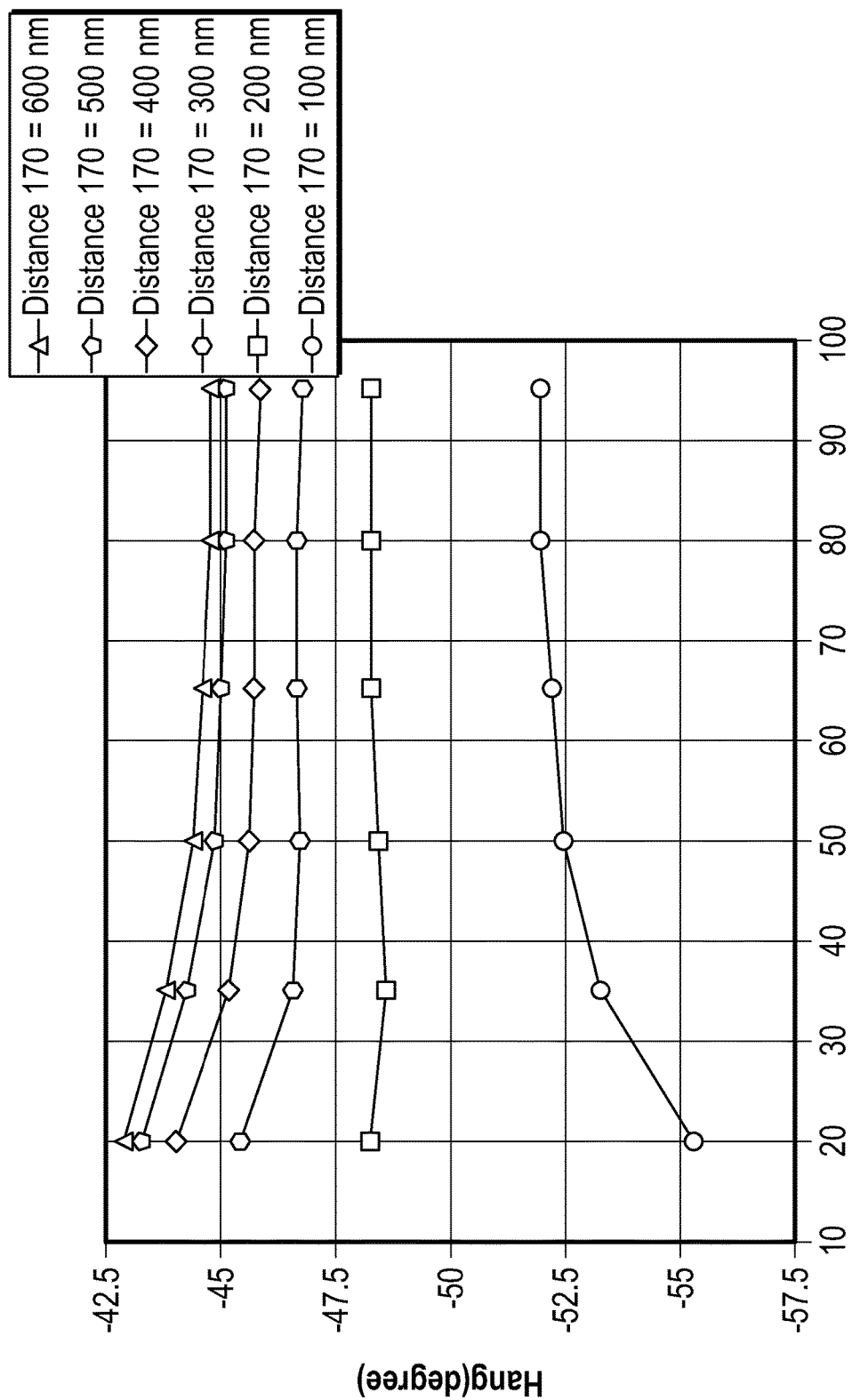
FIG. 4D is a plot of the angle of the magnetic field as a function of the write current for various embodiments.

FIG. 4D is a plot showing the angle of the magnetic field as a function of the write current for various values of the distance 170. As shown by FIG. 4D, return poles 110 with tapered portions 112 provide satisfactory switching performance for all of the distances 170 shown, except perhaps for the distance 170 of 100 nm. Thus, for the selected tapered portion 112 (i.e., illustrated in FIG. 3A with a maximum height 118 of 400 nm, a waveguide-facing side 114B with a length of 50 nm, and an angle 116 of 30 degrees), FIG. 4D indicates that the distance 170 should preferably be larger than 100 nm to provide satisfactory switching. For example, a distance 170 of approximately 300 nm should provide good switching performance for all write current values.

Figure 5A:
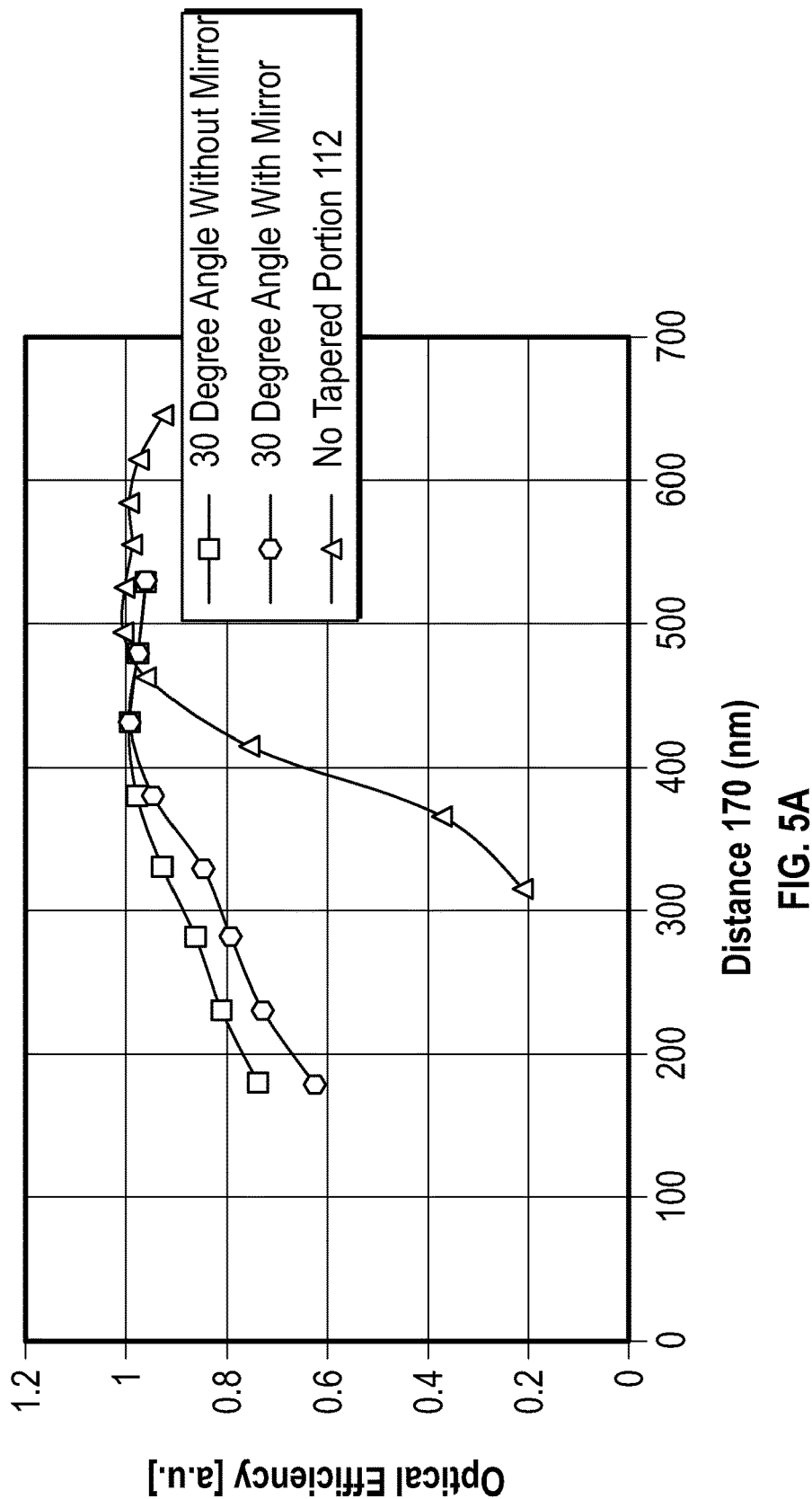
FIG. 5A is a plot illustrating the impact of using a tapered return pole and an optional mirror layer on optical efficiency.

FIG. 5A is a plot showing the impact on optical efficiency of using the optional mirror layer 160, and also shows the effect on optical efficiency of using a tapered portion 112, whether with or without the optional mirror layer 160. The curve with the square markers shows the optical efficiency as a function of the distance 170 for the embodiment of FIG. 3A (i.e., with a maximum height 118 of 400 nm, a waveguide-facing side 114B with a length of 50 nm, and an angle 116 of 30 degrees, without a mirror layer 160). The curve with the hexagonal markers shows the optical efficiency as a function of the distance 170 for the embodiment shown in FIG. 3B (i.e., with a maximum height 118 of 400 nm, a waveguide-facing side 114B with a length of 50 nm, an angle 116 of 30 degrees, and a mirror layer 160). The curve with the triangular markers shows the optical efficiency as a function of distance 170 for the embodiment shown in FIG. 2 (i.e., with no tapered portion 112).

FIG. 5A indicates that the embodiment of FIG. 2 does not achieve satisfactory optical efficiency for distances 170 less than 400 nm, whereas the embodiments of FIGS. 3A and 3B provide higher optical efficiencies at smaller distances 170. For example, at a distance 170 of 400 nm, the embodiments of FIGS. 3A and 3B both provide more than 95% efficiency, whereas the embodiment of FIG. 3B provides less than 70% efficiency. When the distance 170 is 300 nm, the optical efficiency of the embodiment of FIG. 2 is unsatisfactory. In contrast, when the distance is 300 nm, the optical efficiencies of the embodiments of FIGS. 3A and 3B are, respectively, nearly 90% and just over 80%.

Figure 5B:
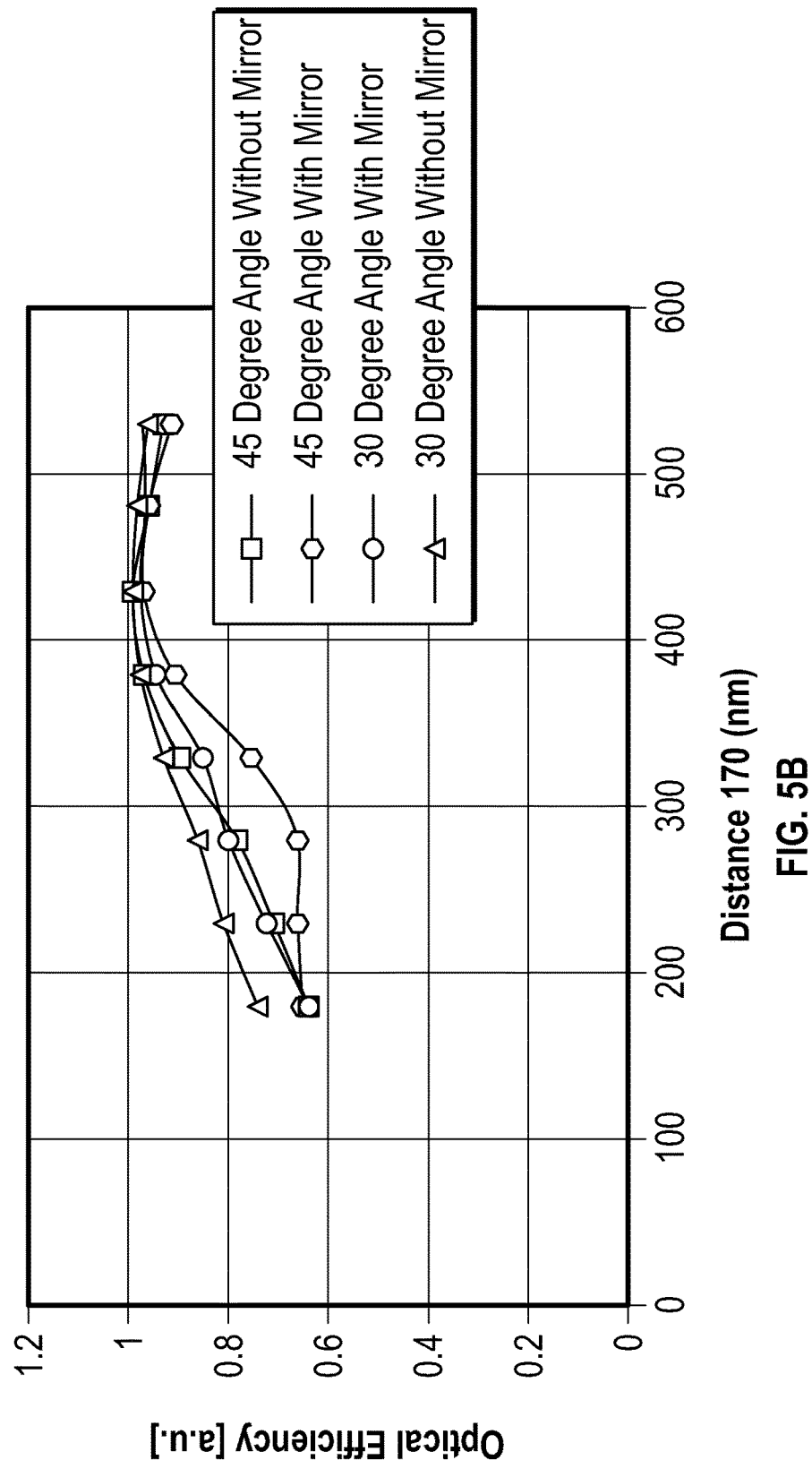
FIG. 5B is a plot illustrating the impact of various parameters of a tapered return pole on optical efficiency.

FIG. 5B is a plot illustrating the impact of the value of the angle 116 on the optical efficiency. In FIG. 5B, the tapered portion 112 is as shown in FIGS. 3A and 3B, with a maximum height 118 of 400 nm, a waveguide-facing side 114B with a length of 50 nm, and an angle 116 of either 30 or 45 degrees. The curve with the square markers shows the optical efficiency as a function of the distance 170 for the embodiment of FIG. 3A (i.e., without a mirror layer 160) with the angle 116 being 45 degrees. The curve with the hexagonal markers shows the optical efficiency as a function of the distance 170 for the embodiment shown in FIG. 3B (i.e., with a mirror layer 160) with the angle 116 being 45 degrees. The curve with the triangular markers shows the optical efficiency as a function of the distance 170 for the embodiment of FIG. 3A (i.e., without a mirror layer 160) with the angle 116 being 30 degrees. The curve with the circular markers shows the optical efficiency as a function of the distance 170 for the embodiment shown in FIG. 3B (i.e., with a mirror layer 160) with the angle 116 being 30 degrees. (The curves in FIG. 5B with the circular and triangular markers are identical to the curves in FIG. 5A with the hexagonal and square markers, respectively.)

FIG. 5B illustrates that for smaller distances 170, a smaller angle 116 without a mirror layer 160 is generally preferable from an optical efficiency standpoint. Of course, the overall performance of a HAMR-enabled write head 100 is also affected by the write current, write field, flux closure, writer saturation, etc. FIGS. 4A-4D and 5A-5B provide insight into how the various parameters of the tapered portion 112 and the mirror layer 160 (if present) can be selected to achieve a desired performance (e.g., by balancing optical efficiency, write current, write field strength, switching speed, etc.).

Figure 6:
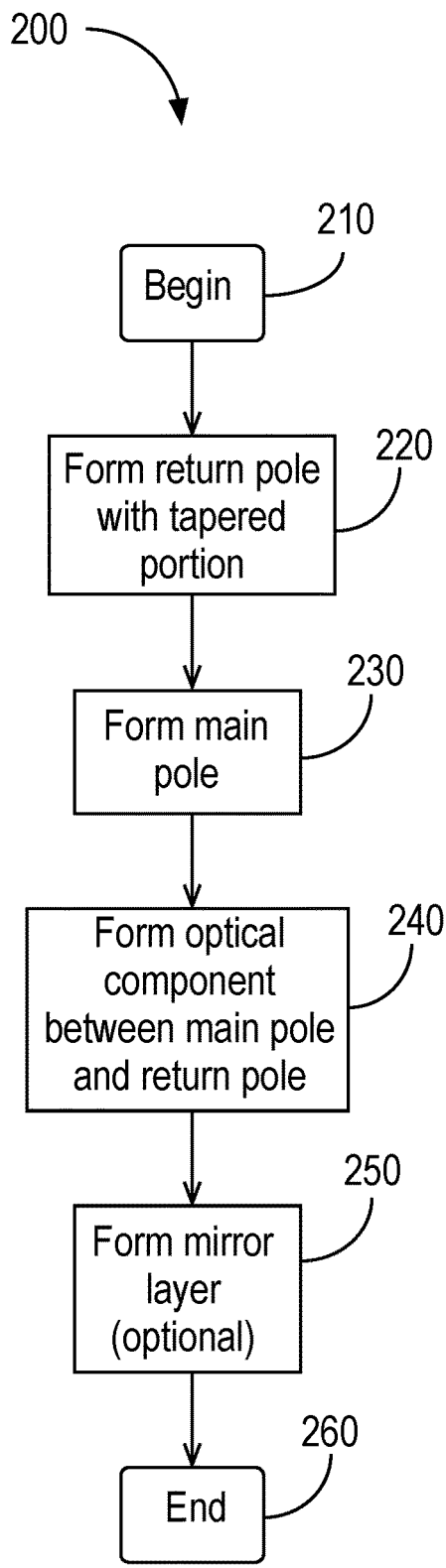
FIG. 6 is a flowchart illustrating a method of fabricating a write head for a data storage device in accordance with some embodiments.

FIG. 6 is a flowchart illustrating a method 200 of fabricating a write head for a data storage device in accordance with some embodiments. At 210, the method 200 begins. At 220, a return pole 110 that has a tapered portion 112 at the ABS 150 is formed such that the tapered portion extends in a first direction. The first direction is the direction that is toward the main pole 120 when the write head is complete. The return pole 110 may be formed by first forming a main portion of the return pole 110 and then forming the tapered portion 112 (or by first forming the tapered portion 112 and then forming the main portion). In some embodiments, the return pole 110 has a gradient in the saturation magnetization of the tapered portion 112. In other embodiments, the saturation magnetization of the tapered portion 112 is substantially constant throughout the tapered portion 112. In some embodiments, at least one aspect of the tapered portion 110 differs from the corresponding aspect of the main portion of the return pole 110. For example, the tapered portion 112 may include a different material, an additional material, different saturation magnetization, etc.

At 230, the main pole 120 is formed. In some embodiments, step 230 includes forming a trench in one or more nonmagnetic layers. For example, one or more reactive ion etches (RIEs) may form the trench, which may have a shape and location that corresponds to the main pole 120. In other embodiments the trench may be provided in a side shield (not illustrated). Magnetic material(s) for the main pole 120 are deposited to form the main pole 120.

At 240, an optical component is formed. When the write head is complete, the optical component resides between the main pole 120 and the return pole 110. The optical component may be, for example, a waveguide (e.g., waveguide cladding 134 and a waveguide core layer 132 as described above) and/or a NFT 125. The fabrication process of the optical component may be conventional. It is to be understood that during fabrication, the optical component may not literally be formed "between" the main pole 120 and the return pole 110. In other words, the optical component may be formed before the main pole 120 is formed or before the return pole 110 is formed. When the write head is complete, the optical component resides between the main pole 120 and the return pole 110.

Optionally, at 250, a mirror layer 160 is formed between the return pole 110 and the optical component. The mirror layer 160, if present, may be formed using conventional processes. It is to be understood that during fabrication, the mirror layer 160 may not be formed "between" the return pole 110 and the optical component. In other words, if it is included, the mirror layer 160 may be formed before the optical component is formed or before the return pole 110 is formed. When the write head is complete, the mirror layer 160, if included, resides between the optical component and the return pole 110. At 260, the method ends.

As will be clear to skilled artisans, some steps of the method 200 may be omitted, interleaved, performed in another order, and/or combined. For example, it may be preferable to perform the steps in the order 220, 250 (if performed), 240, 230. As another example, it may be preferable to perform the steps in the order 230, 240, 250 (if performed), 220.

The method 200 may be used to fabricate multiple write heads at substantially the same time. The method 200 is described in the context of particular layers. The described layers may include multiple materials and/or multiple sublayers. The method 200 also may start after formation of other portions of the write head. Furthermore, additional steps may be performed to fabricate the write head (e.g., to add shields, heat sinks, etc.).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A magnetic write head, comprising:
   a leading side;
   a trailing side;
   an air-bearing surface (ABS);
   a main pole disposed between the leading side and the trailing side and extending to the ABS;
   a return pole comprising a tapered portion at the ABS, wherein the tapered portion is disposed between the main pole and the leading side and extends toward the main pole; and
   a waveguide disposed between the main pole and the return pole the tapered portion being disposed between a portion of the waveguide and the ABS,
   wherein a dimension of the waveguide at the ABS is dependent on a dimension of the tapered portion of the return pole at the ABS.

2. The magnetic write head recited in claim 1, wherein the tapered portion comprises three sides.

3. The magnetic write head recited in claim 1, wherein a cross-section of the tapered portion has a triangular shape.

4. The magnetic write head recited in claim 1, wherein the tapered portion comprises a waveguide-facing side and an ABS-facing side, and wherein an angle between the waveguide-facing side and the ABS-facing side is an acute angle.

5. The magnetic write head recited in claim 4, wherein a size of the acute angle is between approximately 30 and approximately 45 degrees.

6. The magnetic write head recited in claim 1, further comprising a mirror layer disposed between the tapered portion and the waveguide.

7. The magnetic write head recited in claim 1, wherein a distance, at the ABS, between the main pole and the tapered portion is between approximately 100 nm and approximately 600 nm.

8. The magnetic write head recited in claim 1, wherein a distance, at the ABS, between the main pole and the tapered portion is approximately 300 nm.

9. The magnetic write head recited in claim 1, wherein the tapered portion comprises an ABS-facing side, a first waveguide-facing side, and a second waveguide-facing side.

10. The magnetic write head recited in claim 9, wherein a length of the first waveguide-facing side is approximately 50 nm.

11. The magnetic write head recited in claim 10, wherein a length of the second waveguide-facing side is between approximately 495 nm and approximately 700 nm.

12. The magnetic write head recited in claim 9, wherein a length of the first waveguide-facing side is greater than 0 and less than approximately 10 nm.

13. The magnetic write head recited in claim 9, wherein an angle between the ABS-facing side and the second waveguide-facing side is between approximately 30 degrees and approximately 45 degrees.

14. The magnetic write head recited in claim 9, wherein an angle between the ABS-facing side and the second waveguide-facing side is approximately 30 degrees.

15. The magnetic write head recited in claim 9, wherein an angle between the ABS-facing side and the second waveguide-facing side is approximately 45 degrees.

16. The magnetic write head recited in claim 1, wherein a maximum height of the tapered portion is approximately 400 nm.

17. A data storage device comprising the magnetic write head recited in claim 1.

18. A method of fabricating the magnetic write head recited in claim 1, the method comprising:
 forming the return pole comprising the tapered portion at the ABS, the tapered portion extending in a first direction;
 forming the main pole; and
 forming the waveguide between the return pole and the main pole,
 wherein, after the method of fabricating the write head is complete, the first direction is toward the main pole.

19. The method recited in claim 18, wherein forming the return pole is performed before forming the waveguide and before forming the main pole.

20. The method recited in claim 18, wherein forming the return pole is performed after forming the main pole and after forming the waveguide.

21. The method recited in claim 18, wherein forming the waveguide comprises forming waveguide cladding and a waveguide core.

22. The method recited in claim 21, further comprising forming a near-field transducer coupled to the waveguide.

23. The method recited in claim 18, wherein forming the return pole comprises:
 forming a main portion of the return pole; and
 forming the tapered portion on the main portion.

24. The method recited in claim 18, further comprising forming a mirror layer between the return pole and the waveguide.

* * * * *